US008207898B2

(12) United States Patent
Koyanagi et al.

(10) Patent No.: US 8,207,898 B2
(45) Date of Patent: Jun. 26, 2012

(54) ANTENNA UNIT AND COMMUNICATION APPARATUS

(75) Inventors: Yoshio Koyanagi, Yokohama (JP); Kenya Nagano, Sendai (JP)

(73) Assignee: Panasonic Corporation, Osaka (JP)

( * ) Notice: Subject to any disclaimer, the term of this patent is extended or adjusted under 35 U.S.C. 154(b) by 368 days.

(21) Appl. No.: 12/522,705

(22) PCT Filed: Jan. 12, 2007

(86) PCT No.: PCT/JP2007/050355
§ 371 (c)(1), (2), (4) Date: Jul. 9, 2009

(87) PCT Pub. No.: WO2008/084557
PCT Pub. Date: Jul. 17, 2008

(65) Prior Publication Data

US 2010/0053020 A1 Mar. 4, 2010

(51) Int. Cl.
*H01Q 1/24* (2006.01)
*H04M 1/00* (2006.01)

(52) U.S. Cl. ...... 343/702; 343/826; 343/876; 455/575.7

(58) Field of Classification Search ........... 343/700 MS, 343/702, 722, 745, 749, 876, 825, 826, 828, 343/829; 455/575.7
See application file for complete search history.

(56) References Cited

U.S. PATENT DOCUMENTS 5,585,807 A 12/1996 Takei
6,388,625 B1 5/2002 Fukushima et al.
6,529,749 B1 * 3/2003 Hayes et al. ............... 455/575.7
6,757,267 B1 6/2004 Evans et al.
7,420,511 B2 * 9/2008 Oshiyama et al. ..... 343/700 MS
2005/0001769 A1 1/2005 Qi et al.

FOREIGN PATENT DOCUMENTS

JP 02-190006 A 7/1990
JP 7-193421 A 7/1995
JP 2001-244715 A 9/2001
(Continued)

OTHER PUBLICATIONS

Extended European Search Report, dated Apr. 5, 2012, for corresponding European Application No. 07706697.5, 6 pages.

*Primary Examiner* — Michael C Wimer
(74) *Attorney, Agent, or Firm* — Seed IP Law Group PLLC

(57) ABSTRACT

An antenna unit and a communication apparatus are provided, which are operable with respect to wireless systems having three, or more frequencies by employing 2 sets of antenna elements, and which can realize such an antenna structure having a high freedom degree, while the antenna structure can be applied to frequency arrangements as to the plurality of wireless systems. An antenna unit includes a first antenna element 11 connected to a first wireless system operated in a first frequency band, to which electric power is fed; and a second antenna element 12 connected to a second wireless system operated in a second frequency band and a third frequency band, to which electric power is fed; in which the first antenna element 11 and the second antenna element 12 are arranged in a predetermined interval in a substantially parallel manner; and a cut off section 16 for electrically cutting off a connection between the first antenna element 11 and the first wireless system is provided at a power feeding portion "P1 " of the first antenna element 11.

15 Claims, 10 Drawing Sheets

FOREIGN PATENT DOCUMENTS

| | | | |
|---|---|---|---|
| JP | 2003-133828 | A | 5/2003 |
| JP | 2003-198410 | A | 7/2003 |
| JP | 3438228 | B2 | 8/2003 |
| JP | 2003-258674 | A | 9/2003 |
| JP | 2004-032242 | A | 1/2004 |
| JP | 2004-147351 | A | 5/2004 |
| JP | 2005051503 | A | 2/2005 |
| JP | 2005260762 | A | 9/2005 |

* cited by examiner

ANTENNA UNIT AND COMMUNICATION APPARATUS

TECHNICAL FIELD

The present invention is related to an antenna unit and a communication apparatus.

BACKGROUND ART

Very recently, communication apparatuses such as portable wireless appliances have been considerably popularized, and requirements for making these communication apparatuses more compact have been expected. In connection with these compact requirements, antennas have been required to be built in the communication apparatuses. Conventionally, as this sort of antenna units, for instance, one antenna unit is described in a patent publication 1. That is, as shown in FIG. 10, the above-described antenna unit is constructed as a built-in antenna by arranging a non-power feeding element 102 over a power feeding element 101 in such a manner that any current is not induced on a circuit board 103 in order to prevent characteristic deteriorations caused by adverse influences given from human bodies. It should be understood that reference numeral 104 in FIG. 10 indicates a power feeding line.

However, the conventional built-in antenna has a demerit. That is, since radiation toward the human body direction is large, the conventional built-in antenna may be adversely influenced by the human body due to the directivity thereof, and since large loss may be produced during telephone communications, gains of the built-in antenna may not be improved. Under such a circumstance, in order to improve the gains during the telephone communications, it is desirable to cause the conventional built-in antenna to have such a directivity having a direction opposite to the human body.

Under such a circumstance, portable wireless appliance-purpose antenna units capable of achieving high gains and also capable of broadening frequency bands thereof have been proposed (refer to, for instance, patent publication 2). That is, as indicated in FIG. 11, a portable wireless appliance-purpose antenna unit includes a circuit board 201, a line-shaped power feeding antenna element (power feeding element) 202, and a plate-shaped non-power feeding antenna element 203. The circuit board 201 is employed so as to arrange thereon various sorts of circuits of the portable wireless appliance. One end portion of the line-shaped power feeding antenna element 202 is connected to any one board plane of the circuit board 201 via a power feeding point (feeder point). The plate-like non-power feeding antenna element 203 is arranged opposite to any other board plane of the circuit board 201, and is operated as a reflector under such a condition that an electric length of this plate-like antenna element 203 along a longitudinal direction thereof becomes nearly equal to a ½-wavelength thereof. In accordance with such an antenna unit, since the plate-like antenna element (second antenna) 203 having an electromagnetic coupling effect with respect to the power feeding antenna element (first antenna) 202 is operated as the non-power feeding element, the broad frequency band and the high gain of this conventional antenna unit can be realized.

Patent Publication 1: JP-A-2001-244715

Patent Publication 2: JP-A-2004-32242

DISCLOSURE OF THE INVENTION

Problems that the Invention is to Solve

However, in the antenna having the above-described antenna structure, since the antenna structure is operable with respect to two resonant frequencies by employing the non-power feeding element and the power feeding element, namely 2 sets of the antenna elements in total, if such an antenna receives electromagnetic waves having a frequency band different from the frequency bands, then a plurality of antenna elements are required, the total number of which is equal to these frequency bands which should be received by this antenna.

On the other hand, in portable telephones and the like, very recently, there are especially growing needs of multi-band antennas which are operable with respect to a plurality of wireless systems having different frequency bands from each other. Accordingly, technical development capable of accepting these needs is strongly required. However, for example, in such an antenna structure that 3 sets of antenna elements are employed in 3 sets of wireless systems having different frequencies from each other, such mounting spaces of antennas are required, the total quantities of which are equal to a total number (3) of these wireless systems. This antenna structure gives a demerit when the portable telephones are made compact. Moreover, if electric power is fed to the antenna elements operable to three different frequencies by utilizing a single power feeding system, then such a signal which should be originally communication-processed by a certain wireless system may also be received by other wireless systems. As a result, there is such a difficulty that other wireless systems may disturb receptions of signals which should be originally communication-processed by the first-mentioned wireless system.

The present invention has been made to solve the above-described problems, and therefore, has an object to provide an antenna unit and a communication apparatus, which are operable with respect to wireless systems having three, or more frequencies by employing 2 sets of antenna elements, and which can realize such an antenna structure having a high freedom degree, which can be applied to frequency arrangements as to the plurality of wireless systems.

Means for Solving the Problems

An antenna unit of the present invention, comprising:

a first antenna element connected to a first wireless system operated in a first frequency band to feed electric power to the first wireless system; and a second antenna element connected to a second wireless system operated in a second frequency band and a third frequency band to feed electric power to the second wireless system, wherein the first antenna element is arranged in substantially parallel to the second antenna element with a predetermined interval; and wherein a cut off section, that electrically cuts off a connection between the first antenna element and the first wireless system, is provided at a power feeding portion of the first antenna element.

Also, an antenna unit of the present invention, comprising:

a first antenna element connected to a first wireless system operated in a first frequency band to feed electric power to the first wireless system; and a second antenna element connected to a second wireless system operated in a second frequency band and a third frequency band to feed electric power to the second wireless system, wherein the first antenna element is arranged in substantially parallel to the second antenna element with a predetermined interval; and wherein a cut off section, that electrically cuts off a connection between the first antenna element and the first wireless system in the third frequency band, is provided at a power feeding portion of the first antenna element.

Also, an antenna unit of the present invention comprising:

a first antenna element connected to a first wireless system operated in a first frequency band to feed electric power to the first wireless system; and a second antenna element connected to a second wireless system operated in a second frequency band and a third frequency band to feed electric power to the second wireless system, wherein the first antenna element is arranged substantially parallel to the second antenna element, and is separated from the second antenna element by a predetermined distance in order that the first antenna element is operated as a non-power feeding element of the second antenna element in a communication in the third frequency band; and wherein a cut off section, that electrically cuts off a connection between the first antenna element and the first wireless system in the third frequency band, is provided at a power feeding portion of the first antenna element.

Also, it is preferable that the cut off section, that electrically cuts off the connection between the first antenna element and the first wireless system in the communication in the third frequency band, is an LC circuit.

Also, it is preferable that the cut off section, that electrically cuts off the connection between the first antenna element and the first wireless system in the communication in the third frequency band, is an SW circuit.

Also, it is preferable that a straight line which connects a power feeding portion of the second antenna element to a center portion of the first antenna element is located substantially perpendicular to the first antenna element and the second antenna element.

Also, an antenna unit of the present invention, comprising:

a first antenna element connected to a first wireless system operated in a first frequency band to feed electric power to the first wireless system; and a second antenna element connected to a second wireless system operated in a second frequency band and a third frequency band to feed electric power to the second wireless system, wherein the first antenna element is arranged substantially parallel to the second antenna element, and is separated from the second antenna element by a predetermined distance in order that the first antenna element is operated as a non-power feeding element of the second antenna element in a communication in the third frequency band; and wherein a ground section, that electrically grounds in the communication in the third frequency band, is provided so as to be away from an open end of the first antenna element by a distance defined by odd numbered multiplying a ¼-wavelength of the third frequency band.

Also, it is preferable that the ground section, that electrically grounds in the communication in the third frequency band, is an LC circuit.

Also, it is preferable that the ground section, that electrically grounds in the communication in the third frequency band, is an SW circuit.

Also, it is preferable that a straight line which connects a power feeding portion of the second antenna element to the ground section that electrically grounds in the communication in the third frequency band is located substantially perpendicular to the first antenna element and the second antenna element.

Also, an antenna unit of the present invention, comprising:

a first antenna element connected to a first wireless system operated in a first frequency band to feed electric power to the first wireless system; and a second antenna element connected to a second wireless system operated in a second frequency band and a third frequency band to feed electric power to the second wireless system, wherein the first antenna element is arranged substantially parallel to the second antenna element, and is separated from the second antenna element by a predetermined distance in order that the first antenna element is operated as a non-power feeding element of the second antenna element in a communication in the third frequency band;

wherein a cut off section, that electrically cuts off a connection between the first antenna element and the first wireless system in the third frequency band, is provided at a power feeding portion of the first antenna element; and wherein a ground section, that electrically grounds in the communication in the third frequency band, is provided so as to be away from a power feed portion of the first antenna element by a distance defined by odd numbered multiplying a ¼-wavelength of the third frequency band.

Also, it is preferable that the cut off section, that electrically cuts off the connection between the first antenna element and the first wireless system in the communication in the third frequency band, is an LC circuit.

Also, it is preferable that the cut off section, that electrically cuts off the connection between the first antenna element and the first wireless system in the communication in the third frequency band, is an SW circuit.

Also, it is preferable that the ground section, that electrically grounds in the communication in the third frequency band, is an LC circuit.

Also, it is preferable that the ground section, that electrically grounds in the communication in the third frequency band, is an SW circuit.

A communication apparatus of the present invention performs a communication by employing the antenna unit recited in any one of the above-described items.

Advantage of the Invention in accordance with the present invention, two sets of the antenna elements have been connected to antenna elements of the separately provided wireless systems, to which the electric power is fed, in order that these two antenna elements can be simultaneously operated in the separately provided wireless systems. The antenna unit is arranged in such a manner that one-sided antenna element is also operated as a non-power feeding element with respect to another-sided antenna element, so that an antenna unit operable to a plurality of frequencies can be realized. Also, a power feeding portion of a power feeding side is arranged in proximity to a maximum current portion of a non-power feeding element at a desirable frequency so as to cause the non-power feeding element to effectively function. As a consequence, since a single antenna is constructed in such a manner that feeding of electric power is sub-divided so as to energize the single antenna in the different power feeding manners, only two antenna elements can be properly applied to 3, or more sets of wireless systems. Eventually, such an antenna unit having a higher freedom degree, and a communication apparatus can be provided, which are properly applicable to frequency arrangements of the plural wireless systems.

DESCRIPTION OF REFERENCE NUMERALS AND SIGNS

Figure 1:
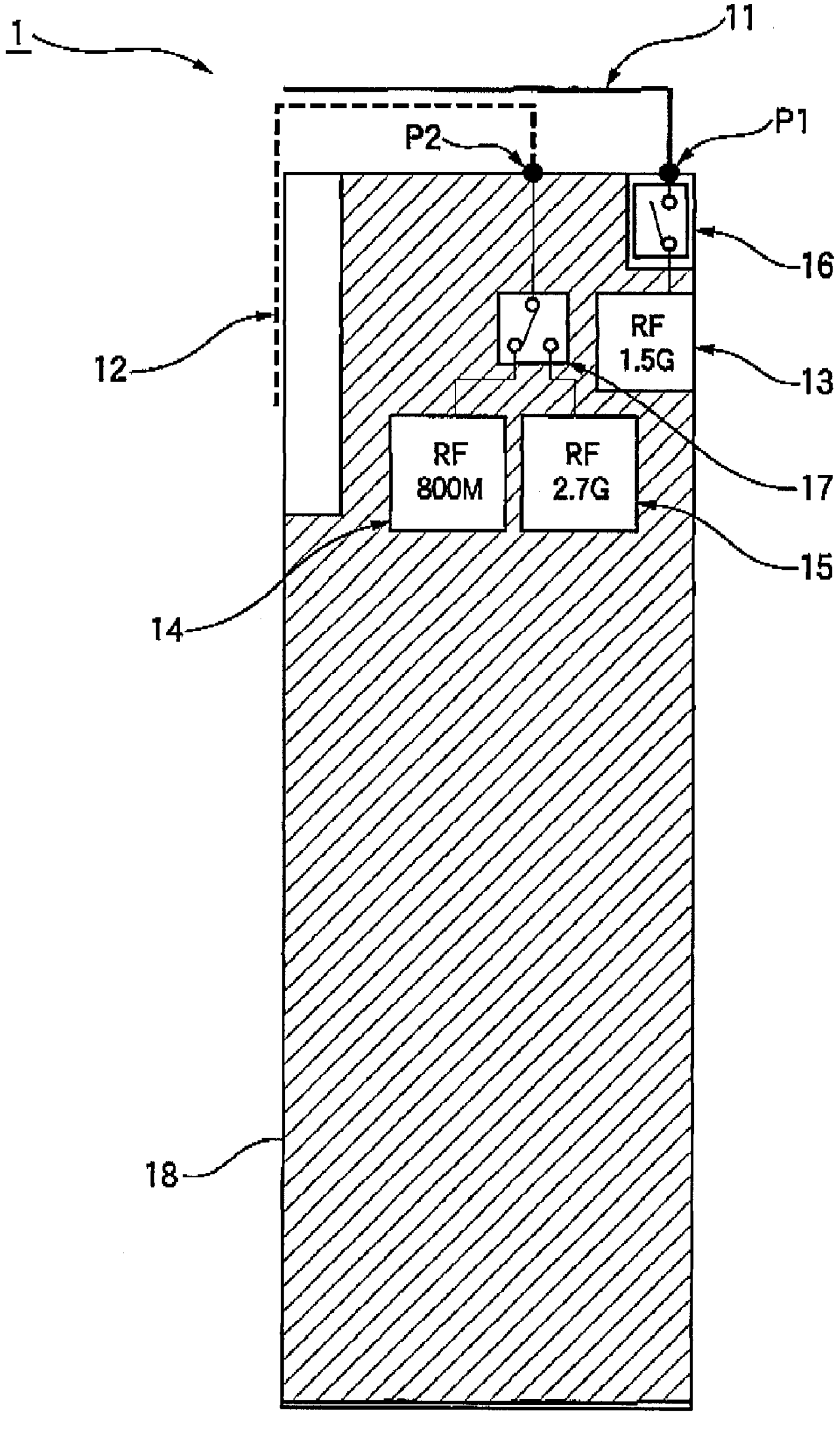
FIG. 1 is a schematic structural diagram for showing an antenna unit applied to a communication terminal apparatus according to a first embodiment of the present invention.

1 to 7 antenna unit
11 first antenna element
12 second antenna element
13 first wireless unit
14 second wireless unit
15 third wireless unit
16 switch(SW)
17 switching circuit
18 ground board
21 LC circuit
22 fourth wireless unit
31 LC circuit
41 LC circuit
51 first antenna element
52 second antenna element
53 first wireless unit
54 second wireless unit
55 (first) LC circuit
61 switch (SM)
71 second LC circuit
P1 first power feeding unit (first port)
P2 second power feeding unit (second port)
F1 first frequency band
F2 second frequency band
F3 third frequency band

BEST MODE FOR CARRYING OUT THE INVENTION

Referring now to accompanying drawings, embodiments of the present invention will be described in detail.

(First Embodiment)

Figure 2:
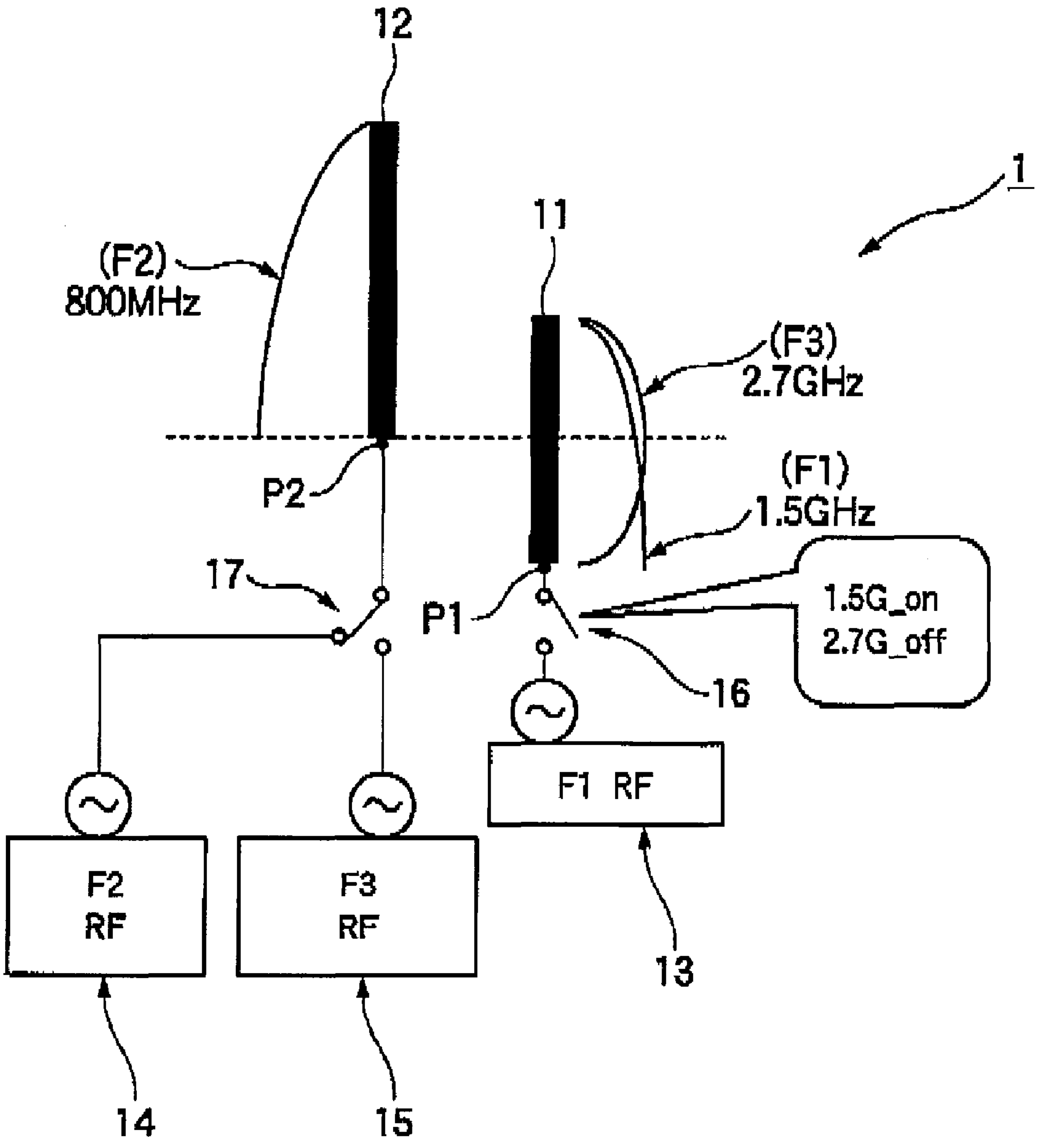
FIG. 2 is an explanatory diagram for indicating a basic idea of an antenna unit according to a first embodiment of the present invention.

FIG. 1 and FIG. 2 indicate an antenna unit 1 according to a first embodiment of the present invention, which is mounted on a portable wireless terminal appliance corresponding to one of communication apparatuses according to the present invention. The antenna unit 1 includes a first wireless system and a second wireless system. The first wireless system is operated in a first frequency band ("F1"; note that wavelength is "$\lambda_1$"). The second wireless system is operated in a second frequency band ("F2"; note that wavelength is "$\lambda_2$"), and a third frequency band ("F3"; note that wavelength is "$\lambda_3$"). That is, the antenna unit 1 of this embodiment includes a first antenna element 11 and a second antenna element 12; a first wireless unit 13, a second wireless unit 14, and a third wireless unit 15; a switch (SW) 16; a switching circuit 17; and a ground board 18, which are provided in a housing of the portable wireless terminal appliance (not shown).

The first antenna element 11 is employed in the first wireless system where the first antenna element 11 is operated in the first frequency band. The first antenna element 11 is connected via the switch 16 to the first wireless unit 13. The first antenna element 11 of this embodiment has a fixed length in so that the first antenna element 11 is operated in a 1.5 GHz corresponding to the first frequency band (F1). Concretely speaking, the first antenna element 11 is constructed as a plate-shaped element ("L" type antenna) in such a manner that the first antenna element 11 is made of a copper plate having a width of 8 mm, the plate-shaped element is bent in an "L" character at a height of 10 mm, and a total length of the plate-shaped element becomes 60 mm in combination with a horizontal element portion having a length of 50 mm. As a consequence, the first antenna element 11 has such a line length which is nearly equal to a ⅓-wavelength ($\lambda_1$) of electromagnetic waves in the 1.5 GHz frequency band, namely, a line length of "$\lambda_1/3$." However, due to the electric length shortening effect caused by the bending operation, the first antenna element 11 is actually operable as the electric length of approximately "$\lambda_1/4$." Also, in a 2.7 GHz frequency band, a line length of the first antenna element 11 becomes 0.54 times longer than the wavelength ($\lambda_3$), and is electrically operable at a length of approximately "$\lambda_3/2$" (namely, half wavelength).

While the second antenna element 12 is employed in the second wireless system where the second antenna element 12 is operated in both the second frequency band and the third frequency band, the second antenna element 12 is connected via the switching circuit 17 to both the second wireless unit 14 and the third wireless unit 15. The second antenna element 12 of this embodiment has an antenna length so that the second antenna element 12 is operated in an 800 MHz frequency band corresponding to the second frequency band (F2). Also, the second antenna element 12 is capacitive coupled with the first antenna element in order that the second antenna element 12 is also operable in a 2.7 GHz band corresponding to the third frequency band (F3). Concretely speaking, the second antenna element 12 is formed as a line-shaped element having a total line length of 250 mm, namely, a meander-shaped line-formed element having a width of 8 mm in such a manner that the line-shaped element is bent in an "L" character at a height of 8 mm, and is furthermore bent in the "L" character at a tip of a horizontal element portion thereof having a length of 30 mm so as to be extended by 35 mm. As a result, the second antenna element 12 is constructed as such a line-shaped element that a total length becomes 73 mm, a total bending number of the meanders becomes 11, and a total line length becomes 250 mm. As a consequence, although the total length of this second antenna element 12 is 73 mm, since the second antenna element 12 is formed in the meander shape, if the following technical points are considered, namely, the total line length of 250 mm and the electric length shortening effect caused by the bent portions, then the second antenna element 12 is operable as approximately "$\lambda_2/4$ (¼-wavelength)" of electromagnetic waves in the 800 MHz frequency band.

The first antenna element 11 and the second antenna element 12 are arranged so that the horizontal element portions thereof are located substantially parallel to each other in an interval of 2 mm. More specifically, a port "P2" (shown in FIG. 1) of the second antenna element 12 is arranged to be located in proximity to a center portion of the first antenna element 11. Concretely speaking, in order that the first antenna element 11 is effectively operable as a non-power feeding element of the second antenna element 12 in the third frequency band, the port "P2" portion to which the electric power is fed in the third frequency band is arranged to be located in proximity to the center portion (namely, such a place separated from both ends of first antenna element by length of "$\lambda_3/4$") of the first antenna element, so that a current distribution of the third frequency band becomes large in the vicinity of the center portion of the first antenna element. Also, while a line which connects the port "P2" of the second antenna element 12 to the center portion of the first antenna element 11 is located at a substantially right angle with respect to the horizontal element portion of the first antenna element 11, since the port "P2" portion is located at the nearest distance with respect to the center portion of the first antenna element 11, there is such a positional relationship that high frequency currents can be effectively produced in the first antenna element due to the electromagnetic induction effect.

Also, the first antenna element 11 is connected via the switch 16 to the first wireless unit 13 of the 1.5 GHz frequency band, so that the port "P1" can be regarded as a power feeding portion (will be referred to as "first power feeding portion "P1"" hereinafter). As previously described, the second antenna element 12 is arranged so that the second antenna element 12 is connectable via the switching circuit 17 to any one of the second wireless unit 14 of the 800 MHz frequency band and the third wireless unit 15 of the 2.7 GHz frequency band, so that the port "P2" can be regarded as a power feeding portion (will be referred to as "second power feeding portion "P2"" hereinafter).

The switch 16 is arranged between the first power feeding portion "P1" of the first antenna element 11 and the first wireless unit 13, and electrically cuts off a connection between the first antenna element 11 and the first wireless system in the third frequency band. In other words, the switch 16 of this embodiment is constructed as a mechanical switch in order that when the first antenna element 11 is used in the 1.5 GHz frequency band, the switch 16 is turned ON, whereas when the first antenna element 11 is used in the 2.7 GHz frequency band, the switch 16 is turned OFF so as to electrically cut off the connection between the first antenna element 11 and the first wireless unit 13.

The first wireless unit 13 feeds electric power to the first antenna element 11 at the frequency "F1 (1.5 GHz)", whereas the second wireless unit 14 and the third wireless unit 15 feed electric power to the second antenna element 12 at the frequencies "F2 (800 MHz)" and "F3 (2.7 GHz)", respectively.

The switching circuit 17 is configured by a switch which switches the connection states between the second antenna element 12, and the second wireless unit 14 and the third wireless unit 15 to any one of a conducting state and a non-conducting state.

The ground board 18 is arranged within the housing (not shown) of the portable wireless terminal appliance. In this embodiment, the ground board 18 has dimensions of 140×50 mm along lateral and longitudinal directions, and both the first antenna element 11 and the second antenna element 12 are arranged at a corner located near an upper edge portion of the ground board 18.

As a consequence, in accordance with this embodiment, although the antenna length of the first antenna element 11 is nearly equal to the ¼-wavelength (=$\lambda_1/4$) in the 1.5 GHz frequency band, since the antenna length of the first antenna element 11 is equal to the 0.54-wavelength in the 2.7 MHz frequency band, the antenna length thereof becomes nearly equal to the ½-wavelength (nearly equal to "$\lambda_3/2$"). As a result, when the switch 16 is turned ON, the first antenna element 11 is operated as a monopole antenna of the 1.5 GHz frequency band. On the other hand, when the second antenna element 12 is electrically connected via the switching circuit 17 to the third wireless unit 15 and the switch 16 is turned OFF, the first antenna element 11 is electromagnetically connected to the third wireless unit 15, so that the first antenna element 11 is operated as a ½-wavelength non-power feeding element of the 2.7 GHz frequency band (third frequency band). In other words, the first antenna element 11 and the second antenna element 12 are connected to separately provided wireless systems which can be operated at the same time so as to feed electric power to these first and second antenna elements 11 and 12, and the first antenna element 11 is operated as the non-power feeding element with respect to the second antenna element 12, so that the first antenna element 11 can be operable with respect to the communication system in the third frequency band.

Figure 3:
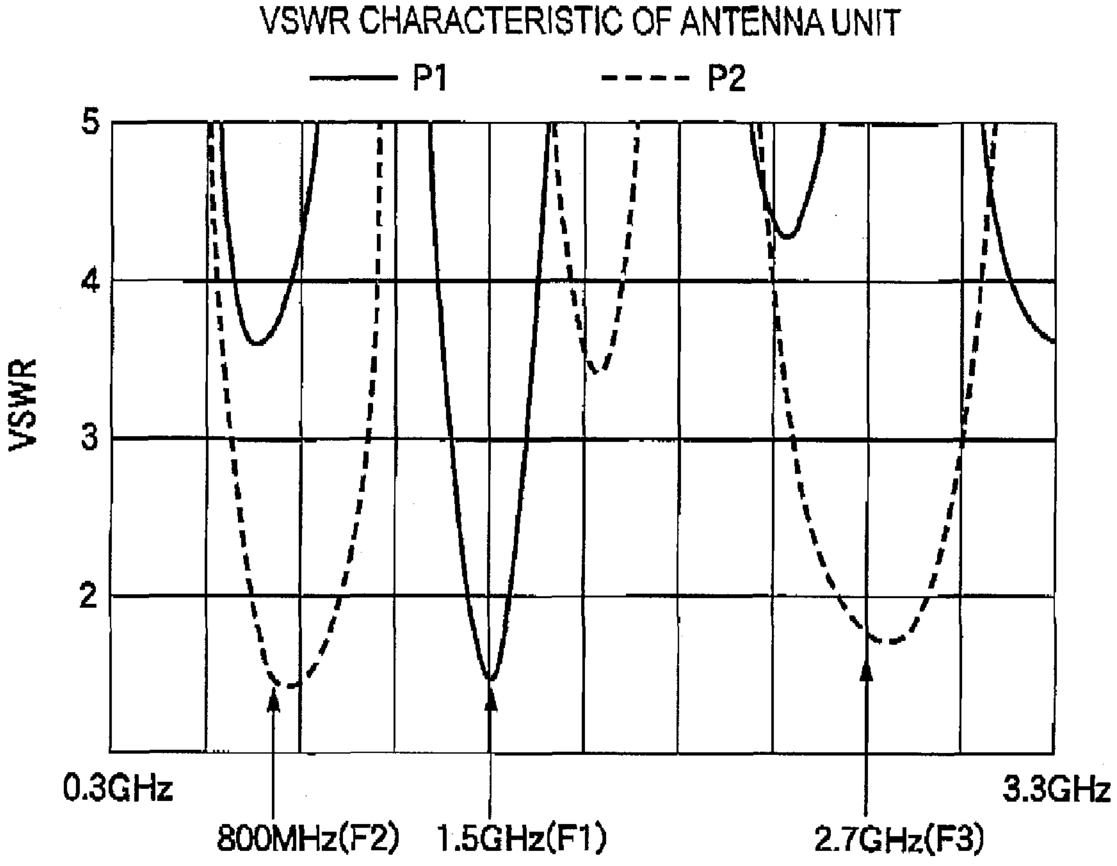
FIG. 3 is a graph for representing a VSWR characteristic of the antenna unit according to the first embodiment of the present invention.

Generally speaking, as such a condition that a single antenna element whose physical length is constant is commonly operable in a plurality of frequencies, any one of commonly-used antenna elements is operated at the lowest frequency, whereas other commonly-used antenna elements must be operated at odd-multiplied frequencies with respect to the lowest frequency. However, in accordance with this embodiment, an antenna structure having a higher freedom degree can be realized without the above-described restriction. In other words, in accordance with the structure of this embodiment, two sets of antenna elements can be connected to separately provided wireless systems which can be operated at the same time so as to feed electric power to these two antenna elements. As a consequence, one-sided antenna element is also operated as a non-power feeding element with respect to another-sided antenna element, so that an antenna unit operable to a plurality of frequencies can be realized, Also, in accordance with this embodiment, a power feeding portion of a power feeding side is arranged in proximity to a maximum current portion of a non-power feeding element at a desirable frequency so as to cause the non-power feeding element to effectively function. Accordingly, since losses caused by a multi-resonant matching circuit can be reduced, such a multi-band operable antenna having a high efficiency can be realized. For instance, in accordance with this embodiment, such superior characteristics represented in FIG. 3 can be achieved with respect to voltage standing-wave ratios (VSWRs) in any of the first frequency band to the third frequency band, while the VSWRs indicate signal losses (occurrence degrees of reflection waves). In other words, the VSWR values can be suppressed to become 1.5 (namely, reflection power is lower than, or equal to 4%) up to approximately 1.75, which may be recognized as superior antenna characteristics. It should also be noted that a matching circuit may be alternatively provided between the port "P1" and the switch 16, or between the port "P2" and the switch 17. As a result, such an antenna structure capable of realizing more superior VSWR values may be alternatively realized. In FIG. 3, while symbol "P1" indicates a VSWR value of the first antenna element 11 at the port "P1", the switch 16 has been turned ON at this time. Also, in FIG. 3, while symbol "P2"

indicates a VSWR value of the second antenna element 12 at the port "P2", the switch 16 has been turned OFF at this time.

Figure 4:
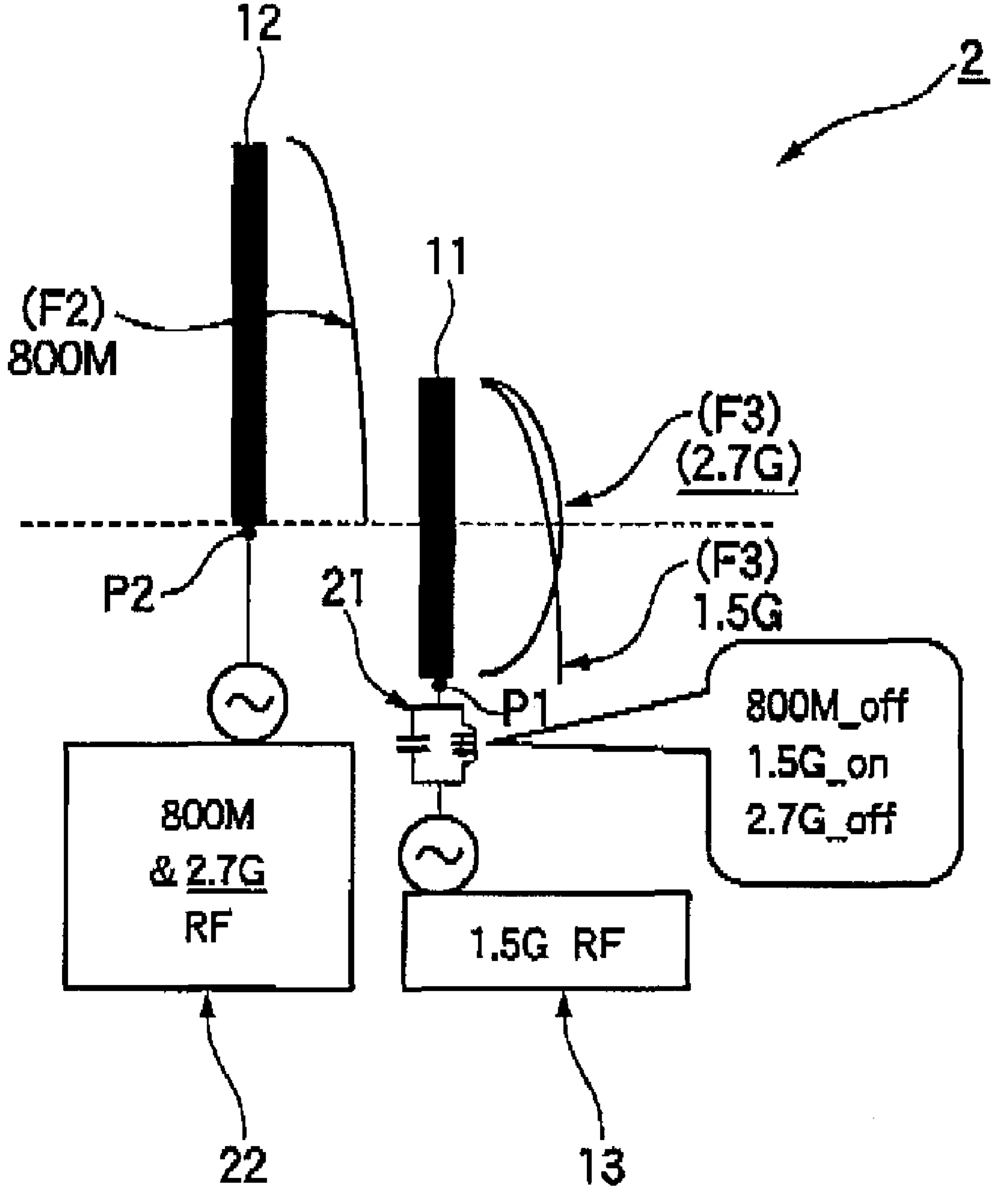
FIG. 4 is an explanatory diagram for showing an antenna unit according to a second embodiment of the present invention.

In this embodiment, if the switch 16 can electrically out off the connection established between the first antenna element 11 and the first wireless unit 13 in the 2.7 MHz frequency band, then this switch 16 may be alternatively arranged by employing another member such as an LC circuit as represented in FIG. 4 (will be discussed later). On the other hand, the switching circuit 17 may be alternatively arranged by employing a commonly operable device, or a coupling device in order that both the second wireless unit 14 which constructs the 800 MHz-band wireless circuit, and the third wireless unit 15 which constructs the 2.7 GHz-band wireless circuit can be used at the same time. Otherwise, if such a wireless circuit is employed which can be commonly operated in both the 800 MHz frequency band and the 2.7 GHz frequency band, then the switching unit 17 is not required.

(Second Embodiment)

Next, a second embodiment of the present invention will be explained with reference to FIG. 4. In this embodiment, the same reference numerals shown in the first embodiment will be employed as those for denoting the same structural elements, and thus, duplicated explanations thereof will be omitted.

Different from the first embodiment, in an antenna unit 2 of the second embodiment, in order that the first antenna element 11 is also operated as a non-power feeding element with respect to the second antenna element 12, an LC circuit 21 is employed as an arrangement capable of electrically cutting off a connection between the first antenna element 11 and the first wireless unit 13 in a high frequency current of the 800 MHz frequency band and a high frequency current of the 2.7 GHz frequency band.

Also, in the first embodiment, the switching circuit 17, the second wireless unit 14, and the third wireless unit 15 are provided. In this embodiment, a fourth wireless unit 22 which is continuously connected to the second antenna element 12 is provided. This fourth wireless unit 22 is arranged so that the fourth wireless unit 22 produces the high frequency current of the second frequency band (F2) and the high frequency current of the third frequency band (F3) at the same time and superimposes both the high frequency currents with each other.

The LC circuit 21 is constructed that the LC circuit 21 passes therethrough the high frequency signal only in a frequency range of the first frequency band (F1), and interrupts the high frequency signals in the frequency ranges of the second frequency band (F2) and the third frequency band (F3). In other words, the LC circuit 21 of this embodiment has constructed a high frequency (LC) filter by employing a coil "L" and a capacitor "C." In this example, in particular, the LC circuit 21 is constituted by such a band-pass filter which passes therethrough only the first frequency band (1.5 GHz), and attenuates the second frequency band (800 MHz) lower than the first frequency band (1.5 GHz), and also attenuates the third frequency band (2.7 GHz) higher than the first frequency band (1.5 GHz).

Also, in this embodiment, the second power feeding portion "P2" of the second antenna element 12 is set to be in proximity to a maximum current portion of the first antenna element 11 in the third frequency band (F3). The maximum current portion of the first antenna element 11 corresponds to a place located in the vicinity of a center portion of the first antenna element 11, namely, such a place separated from both ends of the first antenna element 11 by a length "$\lambda_3/4$." As a result, a high frequency current of 2.7 GHz is produced on the first antenna element 11 due to the electromagnetic induction effect. On the other hand, even when a high frequency current of the third frequency band is produced on the first antenna element 11, the LC circuit 21 is operated, so that the connection between the first antenna element 11 and the first wireless portion 13 is interrupted. As a result, the first antenna element 11 is operated as a non-power feeding antenna element at such a wireless frequency of 2.7 GHz corresponding to the third frequency band (F3) based upon, in particular, a relationship of electric lengths thereof. Since the first antenna element 11 is sufficiently shorter than "$\lambda_2/2$" with respect to the wavelength in the second frequency band, the high frequency current of the second frequency band is not positively induced to the first antenna element in the electromagnetic manner, and thus, the second antenna element can be operated under better condition without being adversely influenced by the first antenna element.

As a consequence, in accordance with this embodiment, the first antenna element 11 is operated at the wireless frequency of the first frequency band (F1), and the second antenna element 12 is operated at the wireless frequency of the second frequency band (F2). In addition, since the first antenna element 11 is operated even at the wireless frequency of the third frequency band (F3), the antenna unit 2 of this embodiment can be simultaneously operated in the three wireless frequency bands.

(Third Embodiment)

Figure 5:
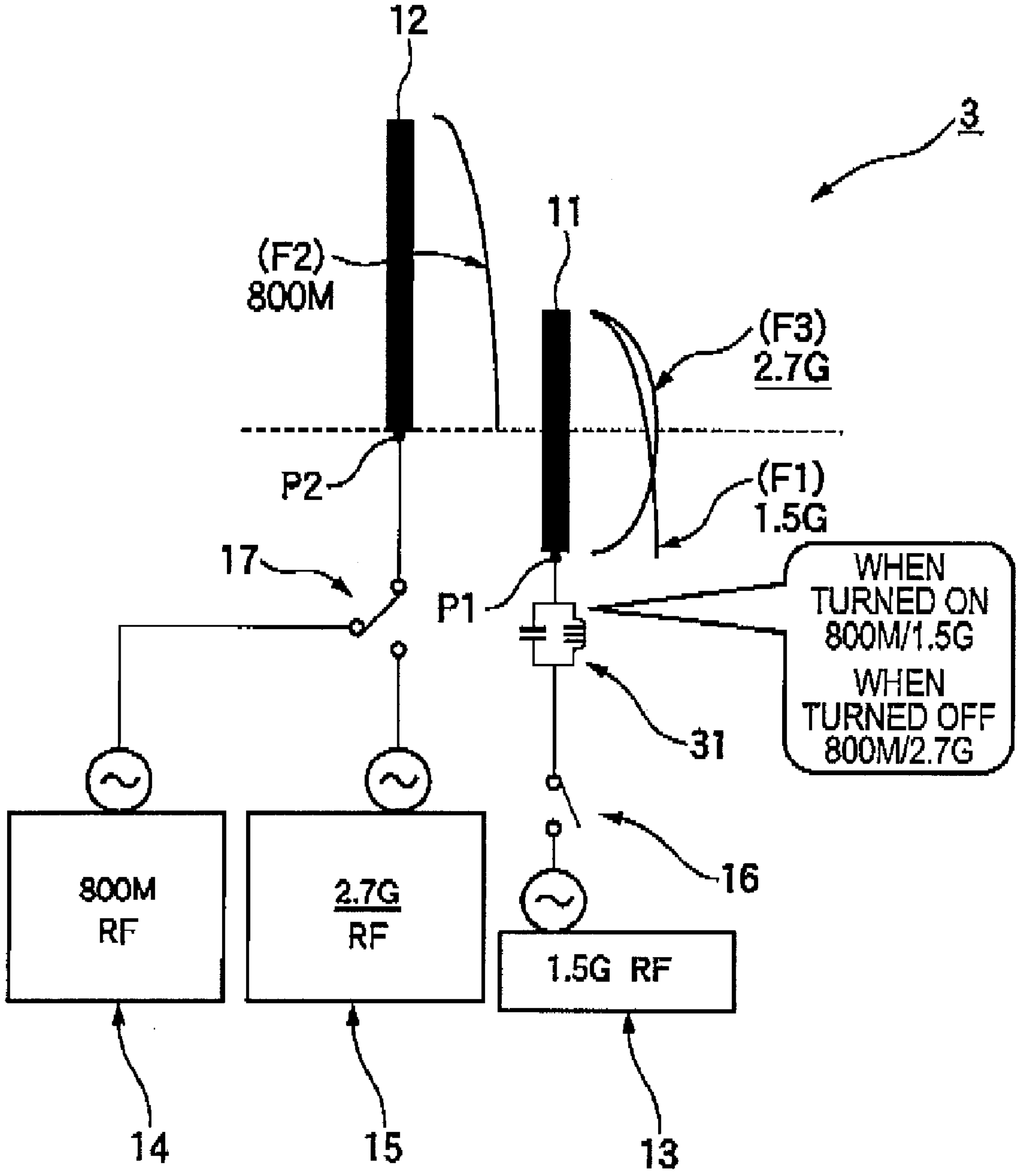
FIG. 5 is an explanatory diagram for indicating an antenna unit according to a third embodiment of the present invention.

Next, a third embodiment of the present invention will be explained with reference to FIG. 5. In this embodiment, the same reference numerals shown in the first embodiment and the second embodiment will be employed as those for denoting the same structural elements, and thus, duplicated explanations thereof will be omitted.

Similar to the second embodiment, in an antenna unit 3 of the third embodiment, in order that the first antenna element 11 can also be operated as a non-power feeding element with respect to the second antenna element 12, an LC circuit 31 is constructed that the connection between the first wireless unit 13 and the first antenna element 11 is electrically cut off in a high frequency current of 2.7 GHz corresponding to the third frequency band by this LC circuit 31. The LC circuit 31 of this embodiment is constituted by such a low-pass filter that although a high frequency current of 1.5 GHz corresponding to the first frequency band is passed, a high frequency current of the third frequency band is interrupted. The LC circuit 31 may pass therethrough, or may alternatively interrupt a high frequency current of 800 MHz corresponding to the second frequency band. Further, such a switch 16 identical to that of the first embodiment is provided between the LC circuit 31 and the first wireless unit 13.

Moreover, while the antenna unit 3 of this embodiment has the same structure as that of the first embodiment, the second antenna element 12 is arranged that this second antenna element 12 is connectable via the switching circuit 17 to any one of the second wireless unit 14 of the 800 MHz frequency band and the third wireless unit 15 of the 2.7 GHz frequency band in the antenna unit 3. That is, similarly, in this embodiment, in order that the first antenna element 11 is effectively operable as a non-power feeding element of the second antenna element 12 in the third frequency band, the port "P2" portion to which the electric power is fed in the third frequency band is arranged to be located in proximity to the center portion (namely, such a place separated from both ends of first antenna element by length "$\lambda_3/4$") of the first antenna element, so that a current distribution of the third frequency band becomes large in the vicinity of the center portion of the first antenna element.

As a consequence, for instance, when the switch 16 is turned ON, the first antenna element 11 is operated as a monopole antenna of the 1.5 GHz frequency band corresponding to the first frequency band. On the other hand, when the second antenna element 12 is electrically connected via the switching circuit 17 to the second wireless unit 14, the second antenna element 12 is operated as an antenna of the 800 MHz frequency band corresponding to the second frequency band.

Also, if the second antenna element 12 is electrically connected via the switching circuit 17 to the third wireless unit 15 of the 2.7 GHz frequency band, even when the switch 16 is turned ON, so that an induction current is produced on the first antenna element 11, then the LC circuit 31 interrupts this high frequency current of the third frequency band, so that the high frequency current of the third frequency band does not flow into the first wireless unit 13, and thus, an electric OFF status is maintained. As a result, the first antenna element 11 functions as a non-power feeding element, and is operated as a ½-wavelength non-power feeding element in the 2.7 GHz frequency band (third frequency band), which is electromagnetically inducted.

As previously described, in accordance with this embodiment, the antenna unit 3 can be selectively operated with respect to the three wireless systems by performing the switching operations of the switch 16 and the switching circuit 17.

(Fourth Embodiment)

Figure 6:
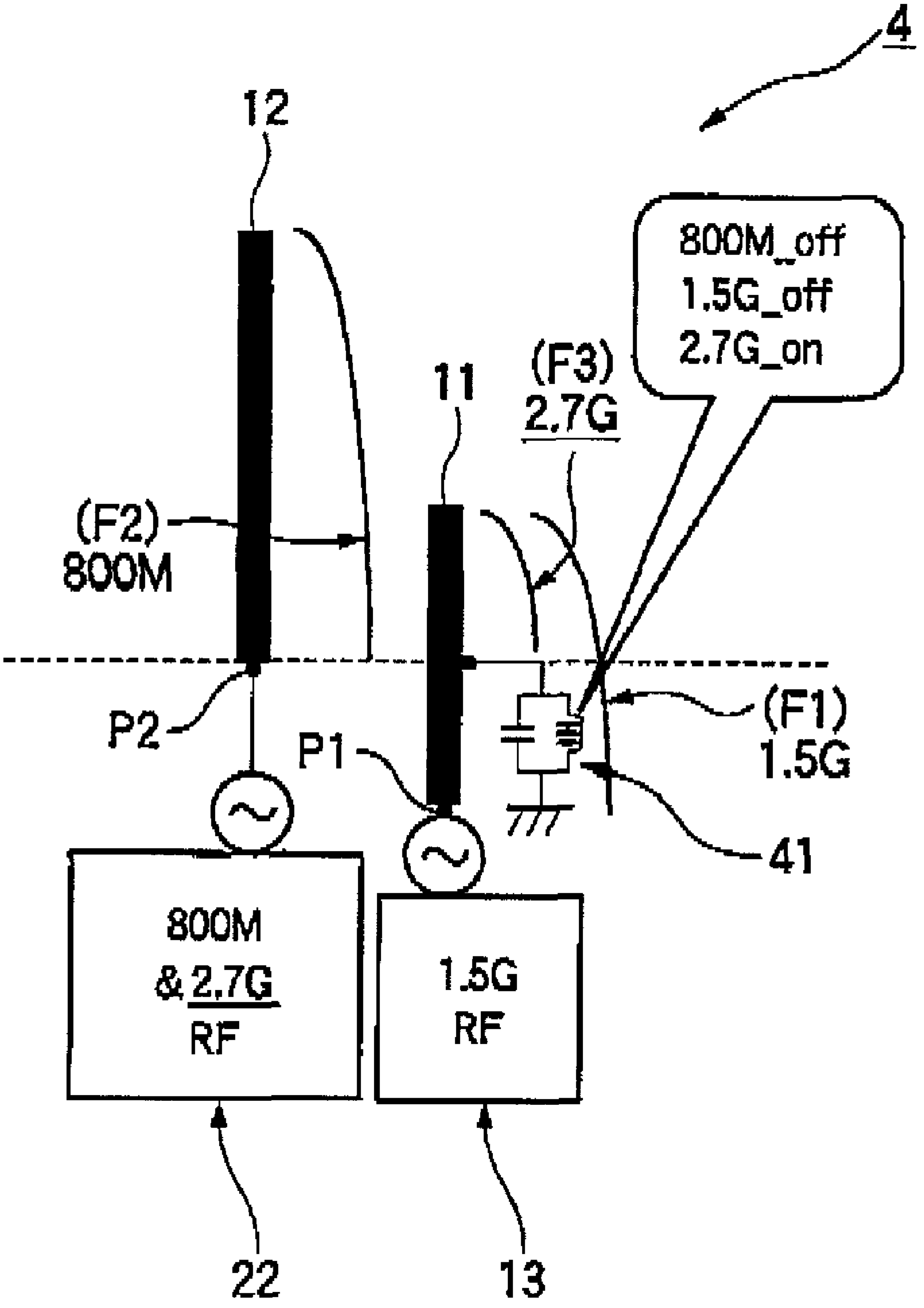
FIG. 6 is an explanatory diagram for showing an antenna unit according to a fourth embodiment of the present invention.

Next, a fourth embodiment of the present invention will be explained with reference to FIG. 6. In this embodiment, the same reference numerals shown in the first embodiment and the second embodiment will be employed as those for denoting the same structural elements, and thus, duplicated explanations thereof will be omitted.

Similar to the second embodiment, although an antenna unit 4 of the fourth embodiment includes the fourth wireless unit 22 which is continuously connected to the second antenna element 12, an LC circuit 41 is grounded to the ground board 18 (refer to FIG. 1), which is different from the LC circuit 21 of the second embodiment.

The LC circuit 41 causes the first antenna element 11 to be electrically grounded to the ground board 18 (refer to FIG. 1) when a desirable frequency band is selected in order that the first antenna element 11 is also operated as a non-power feeding element with respect to the second antenna element 12. While the LC circuit 41 of this embodiment is set to an intermediate portion of the first antenna element 11, the LC circuit 41 is arranged as such a high-pass filter (HPF) that the LC circuit 41 does not pass therethrough the first and second frequency bands (F1, F2) corresponding to a lower frequency band, but passes therethrough only the third frequency band (F3) corresponding to a higher frequency band to the ground board 18. In other words, the LC circuit 41 of the present invention may be realized by such a structure that a ground section for electrically grounding the first antenna element 11 in a communication in the third frequency band is provided at such a position defined by multiplying a ¼ wavelength ($\lambda_3/4$) of the third frequency band by an odd number from an open end of the first antenna element 11.

Also in this embodiment, the second power feeding portion "P2" is arranged in the vicinity of the maximum current portion (near grounding portion) of the first antenna element 11 in the third frequency band.

As a consequence, in accordance with this embodiment, the first antenna element 11 is operated at the wireless frequency of 1.5 GHz corresponding to the first frequency band, and the second antenna element 12 is operated at the wireless frequency of 800 MHz corresponding to the second frequency band. In addition, since the first antenna element 11 is operated at the same time even at the wireless frequency of 2.7 GHz corresponding to the third frequency band (F3) as the non-power feeding element, the antenna unit 4 of this embodiment can be simultaneously operated in the three wireless frequency bands.

(Fifth Embodiment)

Figure 7:
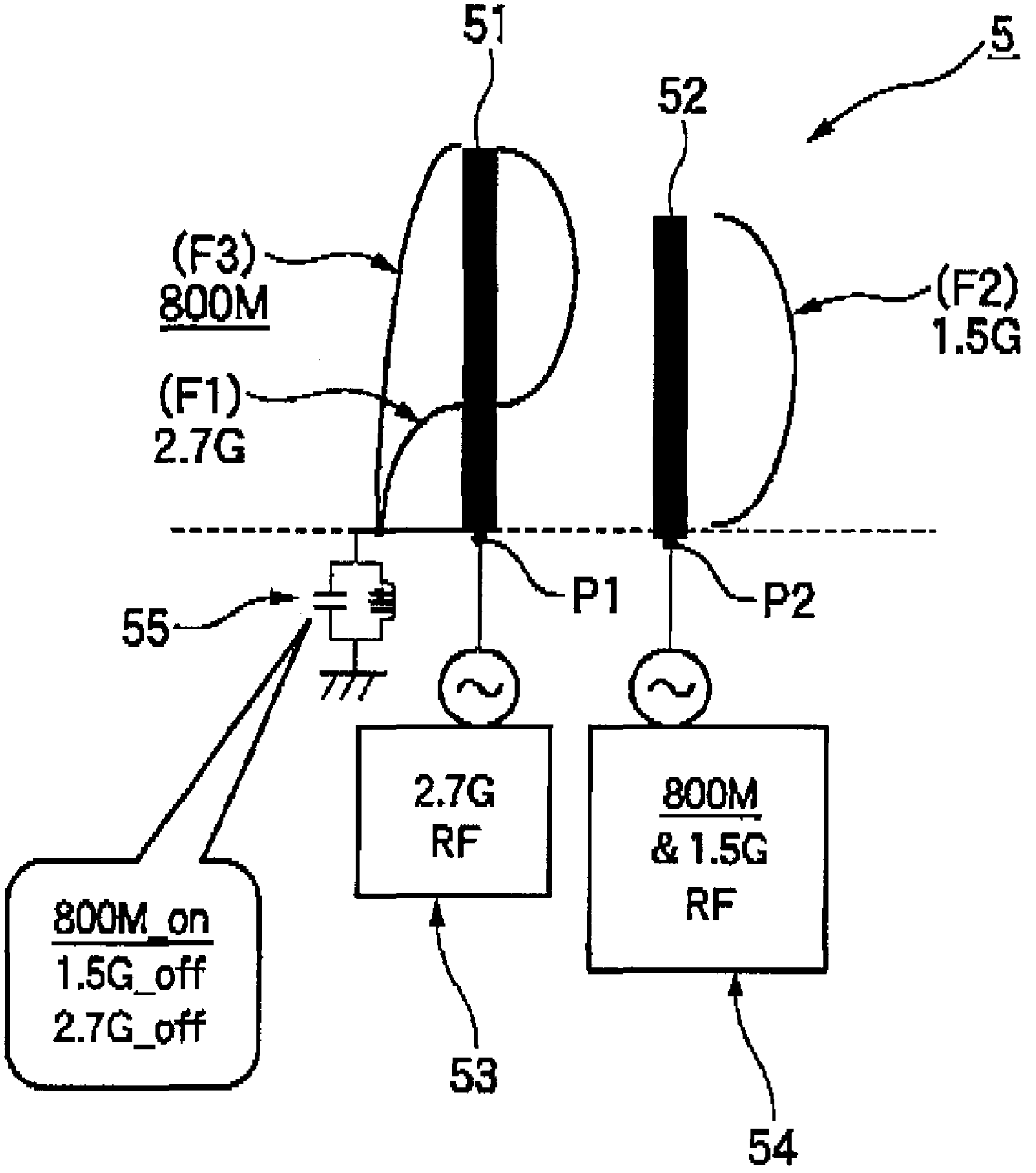
FIG. 7 is an explanatory diagram for indicating an antenna unit according to a fifth embodiment of the present invention.

Next, a fifth embodiment of the present invention will be explained with reference to FIG. 7.

An antenna unit 5 of the fifth embodiment is designed that a first antenna element 51 is operated as a power feeding element in a 2.7 GHz frequency band as a first frequency band (Fl), and further, the first antenna element 51 is operated as a non-power feeding element in an 800 MHz frequency band as a third frequency band (F3). As a result, the first antenna element 51 has such a length equivalent to an electric length of a (¾) wavelength in the first frequency band, and also to have another length equivalent to an electric length of a (¼) wavelength in the third frequency band. Also, the first antenna element 51 is connected via an LC circuit 55 to a first wireless unit 53 at a lower end portion thereof.

The first wireless unit 53 is arranged so that a high frequency current of 2.7 GHz corresponding to the first frequency band is produced. While the LC circuit 55 is set to a lower end portion of the first antenna element 11, the LC circuit 55 is constructed of such a low-pass filter (LPF) that the LC circuit 55 does not pass therethrough the first and second frequency bands (2.7 GHz and 1.5 GHz) corresponding to a higher frequency band, but pass therethrough the third frequency band (800 MHz) corresponding to a lower frequency band, so that the third frequency band (800 MHz) may escape to the ground board 18.

On the other hand, in order that the second antenna element 52 is caused to be operated as a power feeding element in the 1.5 GHz frequency band as the second frequency band, the second antenna element 52 has a length equivalent to an electric length of a (½) wavelength in the 1.5 GHz frequency band, and also, the second antenna element 52 is connected to a second wireless unit 54. This second wireless unit 54 is constructed in that the second wireless unit 54 produces a high frequency current of 1.5 GHz corresponding to the second frequency band, and also, another high frequency current of 800 MHz corresponding to the third frequency band. In a second antenna element having a length equivalent to the electric length of the (½)-wavelength in the 1.5 GHz frequency band, since an impedance thereof is increased, a matching circuit may be alternatively provided between a point "P2" and the second wireless unit 54 in order to establish a matching effect.

As a consequence, in accordance with this embodiment, since the first antenna element 51 is also operable as the non-power feeding element of the second antenna element 52 at the frequency of 800 MHz as the third frequency band, the LC circuit 55 is provided at the first power feeding portion "P1", and then, this LC circuit 55 causes the first antenna element 51 to be grounded when the third frequency band is selected. Also, the second power feeding portion "P2" is provided in proximity to a maximum current portion (namely, near ground portion) of the first antenna element 51, namely, is located near such a place separated from the open end of the second power feeding portion "P2" by a length "$\lambda_1/4$" in the first frequency band. As a consequence, even in this embodiment, the antenna unit 5 can be simultaneously operated in the three wireless frequency bands, which is similar to the fourth embodiment, (Sixth Embodiment)

Figure 8:
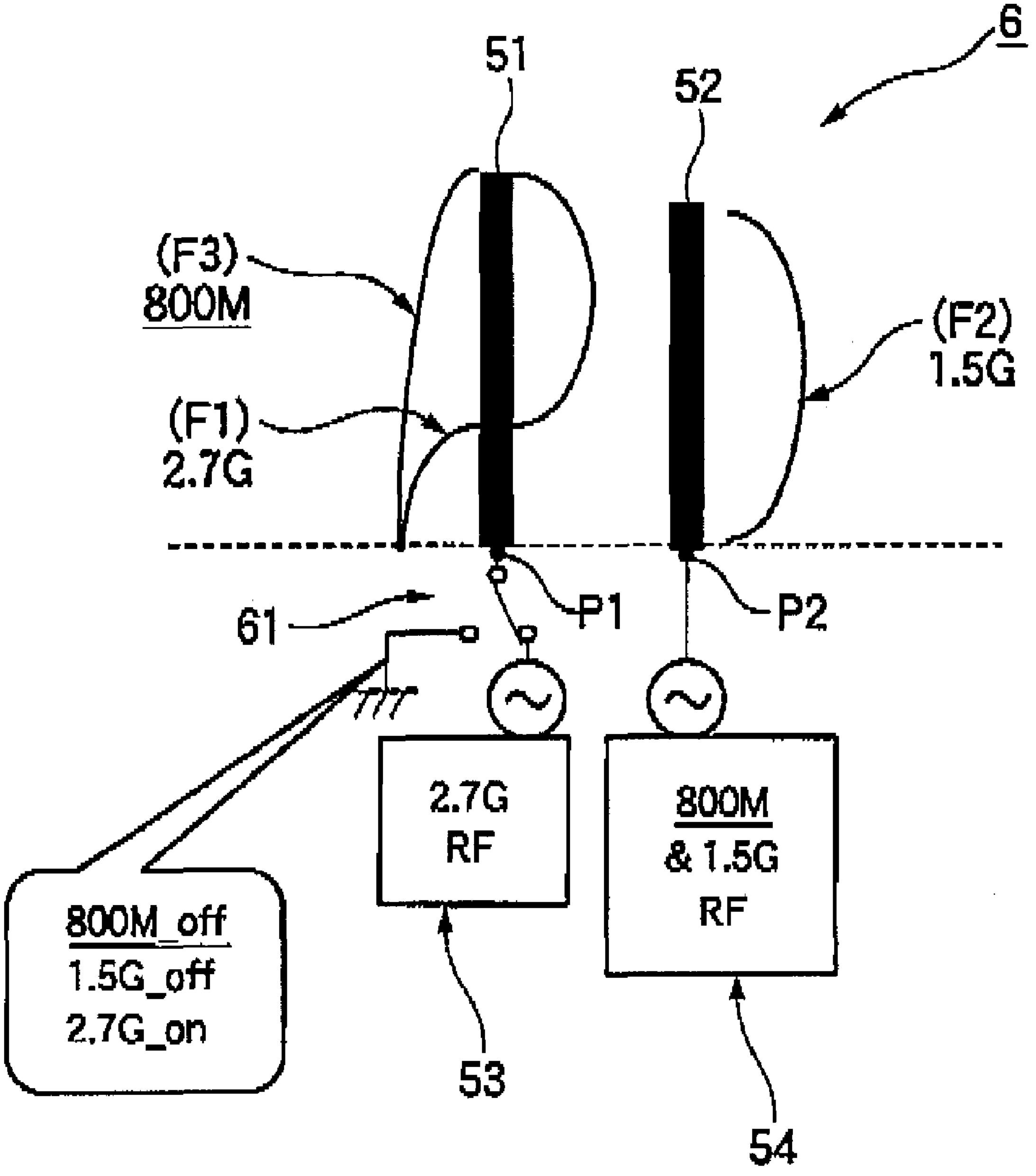
FIG. 8 is an explanatory diagram for showing an antenna unit according to a sixth embodiment of the present invention.

Next, a sixth embodiment of the present invention will be explained with reference to FIG. 8. In this embodiment, the same reference numerals shown in the fifth embodiment will be employed as those for denoting the same structural elements, and thus, duplicated explanations thereof will be omitted.

Different from the fifth embodiment, in an antenna unit 6 of the sixth embodiment, instead of the above-described LC circuit 55, a switch 61 is provided at a lower end portion of the first antenna element 51 between the first antenna element 51 and the first wireless unit 53 in order that the first antenna element 51 can be selectively connected to the first wireless unit 53, or grounded to the ground board 18 (refer to FIG. 1).

On the other hand, similar to the fifth embodiment, while the second antenna element 52 is connected to the second wireless unit 54, a high frequency current of 800 MHz corresponding to the third frequency band is supplied via the second power feeding portion “P2” to the second antenna element 52.

As a consequence, when the switch 61 is operated so as to connect the first antenna element 51 to the first wireless unit 53, the first antenna element 51 is operated as an antenna of 2.7 GHz corresponding to the first frequency band.

On one hand, when the first switch 61 is operated in order to connect the first antenna element 51 to the ground board 18, feeding of the electric power from the first wireless unit 53 to the first antenna element 51 is interrupted. On the other hand, at this stage, the high frequency current of 800 MHz supplied form the second wireless unit 54 is energized in the first antenna element 51 via the second power feeding portion “P2” provided in proximity to the first antenna element 51. As a result, the first antenna element 51 is also operable as a non-power feeding element of the second antenna element 52.

As a consequence, in accordance with this embodiment, such an antenna system functioning as either the antenna operable in both the first frequency band (F1; 2.7 GHz) and the second frequency band (F2; 1.5 GHz) or the antenna operable in both the second frequency band (F2; 1.5 GHz) and the third frequency band (F3; 800 MHz) can be arranged by the switching operation of the switch 51, so that the antenna unit 6 is operable with respect to the three wireless systems.

(Seventh Embodiment)

Figure 9:
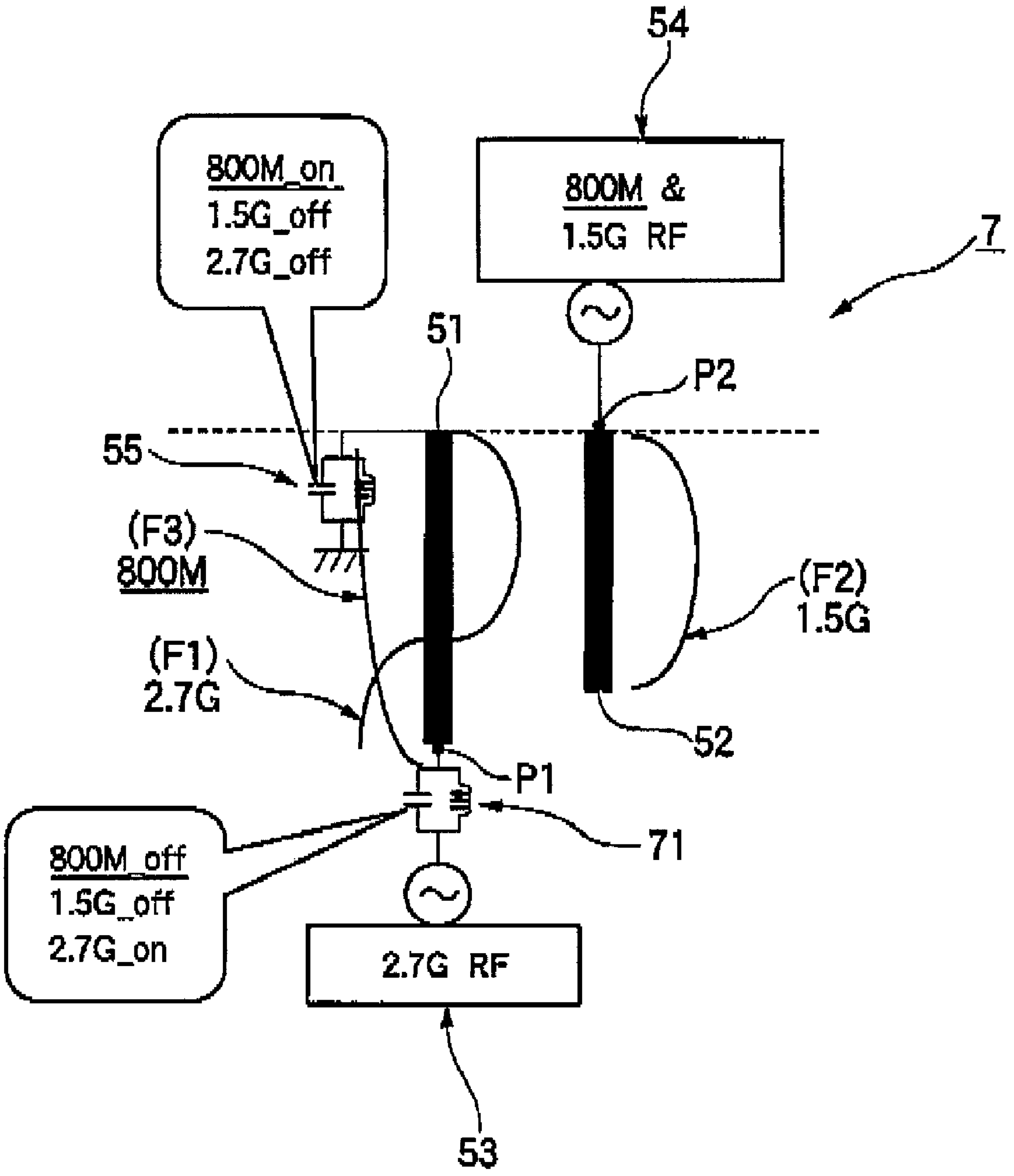
FIG. 9 is an explanatory diagram for indicating an antenna unit according to an eighth embodiment of the present invention.
Figure 10:
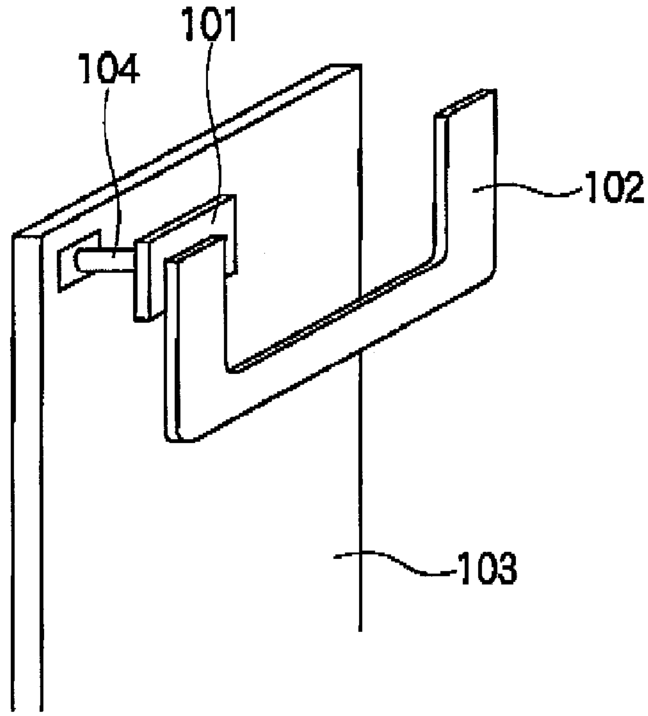
FIG. 10 is an explanatory diagram for representing one example of the conventional antenna units.
Figure 11:
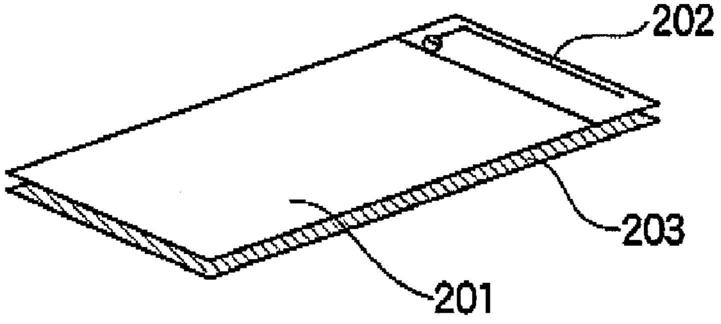
FIG. 11 is an explanatory diagram for showing another example of the conventional antenna units.

Next, a seventh embodiment of the present invention will be explained with reference to FIG. 9. In this embodiment, the same reference numerals shown in the fifth embodiment will be employed as those for denoting the same structural elements, and thus, duplicated explanations thereof will be omitted.

In an antenna unit 7 of the seventh embodiment, such an LC circuit 55 (will be referred to as “first LC circuit 55” hereinafter) identical to that of the fifth embodiment is provided at one end portion of the first antenna element 51. Similar to the fifth embodiment, the first LC circuit 55 is constructed of such a low-pass filter (LPF) which passes therethrough the third frequency band (F3; 800 MHz) corresponding to the lower frequency band, but does not pass therethrough the first and second frequency bands (F1; 2.7 GHz and F2; 1.5 GHz) corresponding to the higher frequency band. It should be noted that similar to the fifth embodiment, the first LC circuit 55 of the present embodiment is the ground section for electrically grounding the first antenna element 51 in the communication of the third frequency band. However, different from the fifth embodiment, the first LC circuit 55 of the present embodiment is provided at an open end position of the first antenna element 51, which corresponds to such a place separated from the first power feeding point “P1” by a length defined by multiplying a ¼-wavelength of the third frequency band by an odd number.

Also, different from the fifth embodiment, in this antenna unit 7, a second LC circuit 71 is provided at a lower end portion of the first antenna element 51 between the first antenna element 51 and the first wireless unit 53. Similar to the fifth embodiment, the first wireless unit 53 produces a high frequency current of 2.7 GHz corresponding to the first frequency band. The second LC circuit 71 is constructed of such a high-pass filter (HPF) which passes therethrough the first frequency band (F1; 2.7 GHz) corresponding to the higher frequency band, and attenuates the second and third frequency bands (F2; 1.5 GHz and F3; 800 MHz) corresponding to the lower frequency band in order that these second and third frequency bands are not passed.

In addition, the second wireless unit 54 same as that of the fifth embodiment is connected to an upper end portion of the second antenna element 52, the second wireless unit 54 produces a high frequency current of 1.5 GHz corresponding to the second frequency band, and a high frequency current of 800 MHz corresponding to the third frequency band, Also, the second power feeding portion “P2” and a maximum current portion (portion near ground portion) of the first antenna element 51 in the second frequency band are arranged in proximity so that the electromagnetic induction effect may occur.

As a consequence, the first antenna element 51 is operated in the first frequency band, since the electric power is fed from the first wireless unit 53 to this first antenna element 51. On the other hand, the second antenna element 52 is operated in the second frequency band, since the electric power is fed from the second frequency band to this second antenna element 52. Moreover, since the high frequency current of 800 MHz corresponding to the third frequency band supplied from the second wireless unit 54 via the second power feeding portion “P2” is energized on the first antenna element 51, this first antenna element 51 is also operable as a non-power feeding element of the second antenna element 52. The second power feeding portion “P2” is located in proximity to the first antenna element 51.

As previously described, in this embodiment, the second LC circuit 71 is arranged so that this second LC circuit 71 is provided at the first power feeding portion “P1” of the first antenna element 51 so as to cut off the connection between the first antenna element 51 and the first wireless unit 53 at the frequency of the second frequency band and also the frequency of the third frequency band, so that the first antenna element 51 is also operable as a non-power feeding element with respect to the second antenna element 52. In other words, the first LC circuit 55 for grounding an upper end portion of the first antenna element 51 at the desirable frequency is provided at the upper end portion of this first antenna element 51 so as to ground the upper end portion of the first antenna element 51 to the ground board 18 (refer to FIG. 1) at the frequency of the third frequency band, so that the first antenna element 51 is operable as the non-power feeding element.

As a consequence, in accordance with this embodiment, since the second power feeding portion “P2” is provided in proximity to the maximum current portion (namely, portion near ground portion) of the first antenna element 51 in the third frequency band, the high frequency current of the third frequency band supplied from the second wireless unit 54 is energized on the first antenna element 51, so that this first antenna element 51 is also operable as an antenna of the third frequency band. As a result, two sets of antenna elements constituted by the first antenna element 51 and the second antenna element 52 can be operated at the same time in three sets of the wireless frequency bands.

While the present invention is described in detail, or with reference to specific embodiments, it is obvious with respect to ordinarily-skilled engineers that the present invention may be modified and changed in various manners without departing from the technical scope and spirit of the present invention.

Industrial Applicability

Since two sets of the antenna elements can be properly operated with respect to the wireless systems having three, or more frequencies, the antenna unit of the present invention has such an effect capable of realizing such antenna structures having higher freedom degrees, which can be adapted to frequency arrangements of the plurality of wireless systems, and has a merit as antennas applied to communication apparatuses such as portable telephones, PHSs, PDAs, and the like.

The invention claimed is:

1. An antenna unit comprising:

a first antenna element connected to a first wireless system operated in a first frequency band, the first antenna element being L-shaped with a first portion forming a longer element of the L-shaped first antenna; and a second antenna element connected to a second wireless system operated in a second frequency band and a third frequency band, the second antenna element including an L-shaped portion with a second portion forming a longer element of the L-shaped portion of the second antenna element, wherein the first portion of the first antenna element and the second portion of the second antenna element extends substantially in a same direction and substantially in parallel to each other, and the first portion is spaced from the second portion by a predetermined interval; and a cut off section configured to electrically cut off a connection between the first antenna element and the first wireless system, the cut off section provided at a power feeding portion of the first antenna element.

2. The antenna unit according to claim 1, wherein the cut off section electrically cuts off connection between the first antenna element and the first wireless system in the third frequency band

3. The antenna unit according to claim 1, wherein the first antenna element operates as a non-power feeding element of the second antenna element during a communication in the third frequency band wherein the cut off section is configured to electrically cut off a connection between the first antenna element and the first wireless system during communication in the third frequency band.

4. The antenna unit according to claim 1, wherein the cut off section is an LC circuit.

5. The antenna unit according to claim 1, wherein the cut off section is an SW circuit.

6. The antenna unit according to claim 1, wherein a power feeding portion of the second antenna element and a center portion of the first antenna element lie in an imaginary line located substantially perpendicular to the first antenna element and the second antenna element.

7. The antenna unit according to claim 3, further comprising a ground section that electrically grounds the first antenna element during communication in the third frequency band, wherein the ground section is located away from a power feed portion of the first antenna element by a distance equal to an odd numbered multiplied by ¼ of the wavelength of the third frequency band.

8. The antenna unit according to claim 7, wherein the ground section is an LC circuit.

9. The antenna unit according to claim 7, wherein the ground section is an SW circuit.

10. A communication apparatus performing a communication by employing the antenna unit according to claim 1.

11. An antenna unit comprising:

a first antenna element connected to a first wireless system operated in a first frequency band, the first antenna element being L-shaped with a first portion forming a longer element of the L-shaped first antenna; and a second antenna element connected to a second wireless system operated in a second frequency band and a third frequency band, the second antenna element including an L-shaped portion with a second portion forming a longer element of the L-shapedportion of the second antenna element, wherein the first portion of the first antenna element and the second portion of the second antenna element extend substantially in a same direction and substantially in parallel to each other and the first portion is spaced from the second portion by a predetermined distance, and the first antenna element operates as a non-power feeding element of the second antenna element during a communication in the third frequency band; and a ground section configured to electrically ground the first antenna element during communication in the third frequency band, wherein the ground section is located away from an open end of the first antenna element by a distance equal to an odd numbered multiplied by ¼ of the wavelength of the third frequency band.

12. The antenna unit according to claim 11, wherein the ground section is an LC circuit.

13. The antenna unit according to claim 11, wherein the ground section is an SW circuit.

14. The antenna unit according to claim 11, wherein a power feeding portion of the second antenna element and the ground section are located on an imaginary line that is substantially perpendicular to the first antenna element and the second antenna element.

15. A communication apparatus performing a communication by employing the antenna unit according to claim 11.

* * * * *